United States Patent
Hardie et al.

(10) Patent No.: US 9,288,216 B2
(45) Date of Patent: Mar. 15, 2016

(54) METHODS AND APPARATUS FOR REDUCING THE EFFECTIVENESS OF CHOSEN LOCATION ATTACKS IN A PEER-TO-PEER OVERLAY NETWORK

(75) Inventors: Edward T. L. Hardie, Menlo Park, CA (US); Lakshminath R. Dondeti, Hyderabad (IN); Ranjith S. Jayaram, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 12/486,415

(22) Filed: Jun. 17, 2009

(65) Prior Publication Data

US 2010/0050235 A1 Feb. 25, 2010

Related U.S. Application Data

(60) Provisional application No. 61/073,903, filed on Jun. 19, 2008.

(51) Int. Cl.
*G06F 21/20* (2006.01)
*G06F 15/173* (2006.01)
(Continued)

(52) U.S. Cl.
CPC .......... *H04L 63/126* (2013.01); *H04L 63/1416* (2013.01); *H04L 67/104* (2013.01); *H04L 67/1044* (2013.01)

(58) Field of Classification Search
CPC .............. H04L 67/104; H04L 67/1044; H04L 67/1046; H04L 67/1048; H04L 67/1068; H04L 63/126; H04L 67/11416; H04L 63/1416; H04L 67/10468
USPC ................... 726/22, 23, 25, 26; 709/223–229
See application file for complete search history.

(56) References Cited

U.S. PATENT DOCUMENTS 6,324,577 B1* 11/2001 Hirai .............................. 709/223
6,442,694 B1* 8/2002 Bergman et al. ................ 726/22
(Continued)

FOREIGN PATENT DOCUMENTS

| EP | 1361728 A2 | 11/2003 |
| EP | 1906616 A1 | 4/2008 |
| JP | 2004030610 A | 1/2004 |

OTHER PUBLICATIONS

T. Condie, V. Kacholia, S. Sankararaman, J. M. Hellerstein, P. Maniatis, 'Induced Churn as Shelter from Routing-Table Poisoning', Proceedings of Network and Distributed Security System Symposium, San Diego, California, Feb. 2006, 16 pages.*
(Continued)

*Primary Examiner* — Catherine Thiaw

(57) ABSTRACT

Methods and apparatus for reducing the effectiveness of chosen location attacks in a peer-to-peer overlay network. A method includes determining that new node identifiers are to be generated for a plurality of nodes in the network, inputting parameters to a hash function to generate a selected node identifier, and adopting a location in the network associated with the selected node identifier. Another method includes receiving a node identifier associated with a selected node, inputting parameters associated with the selected node to a hash function to generate a corresponding node identifier, comparing the node identifier with the corresponding node identifier, and determining that the selected node is a potential attacker if the node identifiers do not match. Another method includes detecting responsibility for initiating an update to one or more node identifiers, generating parameters to generate the node identifiers, and transmitting the parameters on the network.

44 Claims, 7 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 7,299,351 | B2* | 11/2007 | Huitema | H04L 63/04 713/156 |
| 7,710,882 | B1* | 5/2010 | Previdi | H04L 45/02 370/229 |
| 8,140,545 | B2* | 3/2012 | Iselborn et al. | 707/752 |
| 8,571,882 | B1* | 10/2013 | Teitelbaum | 705/2 |
| 2004/0064693 | A1 | 4/2004 | Pabla et al. | |
| 2004/0133675 | A1* | 7/2004 | Ishiyama et al. | 709/224 |
| 2005/0030902 | A1* | 2/2005 | Choi et al. | 370/252 |
| 2005/0042634 | A1* | 2/2005 | Jones et al. | 435/6 |
| 2006/0133289 | A1* | 6/2006 | Golle et al. | 370/252 |
| 2006/0161657 | A1* | 7/2006 | Gupta et al. | 709/224 |
| 2006/0253573 | A1* | 11/2006 | Trisno et al. | 709/224 |
| 2007/0094494 | A1* | 4/2007 | Banerjee et al. | 713/157 |
| 2007/0230468 | A1* | 10/2007 | Narayanan et al. | 370/392 |
| 2007/0233832 | A1* | 10/2007 | Narayanan et al. | 709/223 |
| 2008/0072037 | A1* | 3/2008 | Narayanan | H04L 9/3215 713/156 |
| 2008/0120702 | A1 | 5/2008 | Hokimoto | |
| 2008/0137663 | A1 | 6/2008 | Gu et al. | |
| 2008/0288654 | A1* | 11/2008 | Matuszewski et al. | 709/238 |
| 2010/0110935 | A1* | 5/2010 | Tamassia et al. | 370/256 |

OTHER PUBLICATIONS

Bryan, et al: "Concepts and Terminology for Peer to Peer SIP"; Cisco Systems; P2PSIP Working Group; Internet-Draft; Mar. 4, 2007.
Gupta, et al: "Efficient Routing for Peer-to-Peer Overlays"; MIT Computer Science and Artificial Intelligence Laboratory: csail.mit.edu.
Guham et al: "NAT Behavioral Requirements for TCP draft-ietf-behave-tcp-7.txt"; Cisco Systems; Network Working Group: Internet-Draft; Oct. 30, 2007
Cheshire, et al: "DNS-Based Service Discovery"; Apple Inc.; Internet-Draft; Sep. 10, 2008.
Cheshire, et al: "Multicast DNS"; Apple Inc.; Internet-Draft, Sep. 10, 2008.
Rosenberg, J.; "Interactive Connectivity Establishment (ICE): A Protocol for Network Address Translator (NAT) Traversal for Offer/Answer Protocols"; Cisco Systems; Internet-Draft; Oct. 29, 2007.
Rosenberg, J.: "TCP Candidates with Interactive Connectivity Establishment (ICE)": Cisco Systens: Internet-Draft; Feb. 25, 2008.
Rosenberg, J.: "NICE: Non-Session Initiation Protocol (SIP) Usage of Interactive Connectivity Establishment (ICE)"; Cisco Systems; Internet-Draft; Feb. 15, 2008.
Rosenberg, et al: "Session Traversal Utilities for (NAT) (STUN)"; Cisco Systems; Internet-Draft; Feb. 23, 2008.
Rosenberg, et al: "Traversal Using Relays Around NAT (TURN): Relay Extensions to Session Traversal Utilities for NAT (STUN)"; Cisco Systems: Internet-Draft; Feb. 25, 2008.
International Search Report and Written Opinion—PCT/US2009/048046—ISA/EPO—Jan. 21, 2010.
Conde, T., et al., "Maelstrom: Churn as Shelter", Technical Report No. UCB/EECS-2005-11, Nov. 10, 2005, <URL:http://www.eecs.berkeley.edu/Pubs/TechRpts/2005/EECS-2005-11.html>.
Dinger, J., et aL, "Defending the Sybil Attack in P2P Networks: Taxonomy, Challenges, and a Proposal for Self-Registration", Proceedings of the First International Conference on Availability, Reliability and Security, Apr. 2006, pp. 756-763.
Taiwan Search Report—TW098120659—TIPO—Oct. 5, 2013.
Gupta et al., "Efficient Routing for Peer to Peer Overlays", MIT Computer Sciences and Artificial Intelligence Laboratory, csail.mit.edu. Published 2004.

* cited by examiner

METHODS AND APPARATUS FOR REDUCING THE EFFECTIVENESS OF CHOSEN LOCATION ATTACKS IN A PEER-TO-PEER OVERLAY NETWORK

CLAIM OF PRIORITY UNDER 35 U.S.C. §119

The present Application for patent claims priority to Provisional Application No. 61/073,903 entitled "Methods and Apparatus for reducing the Effect of Chosen Location Attacks in an Overlay Network" filed Jun. 19, 2008, and assigned to the assignee hereof and hereby expressly incorporated by reference herein.

BACKGROUND

1. Field

The present application relates generally to the operation of overlay networks, and more particularly, to methods and apparatus for reducing the effectiveness of chosen location attacks in a peer-to-peer overlay network.

2. Background

A network in which member nodes obtain services in the absence of server-based infrastructure is referred to herein as a "peer-to-peer" overlay network. In a peer-to-peer overlay, peer nodes co-operate with each other both to provide services and to maintain the network. Peer-to-peer overlay networks can be built on top of an underlying network, such as a network utilizing the Internet Protocol (IP).

Distributed hash table (DHT) based peer-to-peer overlay networks use identifiers which are based on hashes of identifying information. Commonly the same hash-based mechanism is used to create both node identifiers and resource identifiers. If an unauthorized entity can choose a specific node identifier, they can either become a critical player in queries routed to a specific node or take control of a specific resource. Such activity is commonly referred to as a chosen location attack.

The traditional approach to solving chosen location attacks in DHT based networks is centralized enrollment of nodes. A centralized enrollment server charged with admitting nodes can ensure that the node identifiers provided are truly random. To mount a chosen location attack, the attacker must make a large number of attempts to join; discarding identifiers assigned which do not provide an attack vector. If the enrollment server requires proof of identity, it may be impossible to make a sufficient number of join attempts to mount an attack. However, utilizing a central enrollment server presents several problems. For example, the enrollment server has a large responsibility and therefore may need to have an uninterruptible power source to assure availability. Additionally, the enrollment server may require backups and special network servers. Furthermore, even if the enrollment server is operating properly, it may itself be compromised thereby compromising the operation of the entire overlay network.

Therefore, it is desirable to have a simple cost effective mechanism that operates to reduce the effectiveness of chosen location attacks in a peer-to-peer overlay network.

SUMMARY

In one or more aspects, a peer-to-peer overlay network protection system, comprising methods and apparatus, is provided that operates to protect against chosen location attacks in a peer-to-peer overlay network.

In an aspect, a method is provided for operating a node to protect against chosen location attacks in a peer-to-peer overlay network. The method comprises determining that new node identifiers are to be generated for a plurality of nodes in the overlay network, inputting selected parameters to a hash function to generate a selected node identifier, and adopting a location in the peer-to-peer overlay network associated with the selected node identifier.

In an aspect, a node is provided that is operable to protect against chosen location attacks in a peer-to-peer overlay network. The node comprises a timing module configured to determine that new node identifiers are to be generated for a plurality of nodes in the overlay network and a processor module configured to input selected parameters to a hash function to generate a selected node identifier and adopt a location in the peer-to-peer overlay network associated with the selected node identifier.

In an aspect, a method is provided that is operable by a node for protecting against chosen location attacks in a peer-to-peer overlay network. The method comprises receiving a new node identifier associated with a selected node, inputting selected parameters associated with the selected node to a hash function to generate a corresponding node identifier, comparing the new node identifier with the corresponding node identifier, and determining that the selected node is a potential attacker if the new node identifier does not match the corresponding node identifier.

In an aspect, a node is provided that is operable to protect against chosen location attacks in a peer-to-peer overlay network. The node comprises a transceiver configured to receive a new node identifier associated with a selected node, and a processor configured to input selected parameters associated with the selected node to a hash function to generate a corresponding node identifier, compare the new node identifier with the corresponding node identifier and determine that the selected node is a potential attacker if the new node identifier does not match the corresponding node identifier.

In an aspect, a method is provided for operating a node to protect against chosen location attacks in a peer-to-peer overlay network. The method comprises detecting responsibility for initiating an update to one or more node identifiers associated with one or more nodes, respectively, generating parameters that can be used by the one or more nodes to generate the one or more node identifiers, and transmitting the parameters on the peer-to-peer overlay network.

In an aspect, a node is provided that is configured to protect against chosen location attacks in a peer-to-peer overlay network. The node comprises a processor configured to detect responsibility for initiating an update to one or more node identifiers associated with one or more nodes, respectively, and generate parameters that can be used by the one or more nodes to generate the one or more node identifiers. The node further comprises a transceiver configured to transmit the parameters on the peer-to-peer overlay network.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a peer-to-peer overlay network protection system that operates to protect against chosen location attacks in a peer-to-peer overlay network. In an aspect, a distributed hash table (DHT) based peer-to-peer overlay network maintains a cooperative time service whereby all nodes in the overlay are time synchronized. For example, in an aspect, a mechanism similar to network time protocol (NTP) may be used to provide the cooperative time service. When a node joins the peer-to-peer overlay network it asserts its own node identifier that is generated by a hash function using a set of inputs chosen by the peer-to peer overlay network. In one implementation, the privileges of a newly joining node are limited during the time prior to the node's completing some number (i.e., one or two) of node identifier transitions. The node identifier that is asserted is not, however, permanent; the peer-to-peer overlay network will require each node to update its node identifier periodically, using information such as its current node identifier, current time, a salt value, or other information as inputs to a hash function. In an aspect, the time when the nodes update their respective identifiers is set randomly within a bounded period by a node identified at random at the time of the last change or update.

An attempted chosen location attack may occur when an attacker asserts a specific node identifier which gives the attacker access to a particular location on the peer-to-peer overlay network. The system operates to mitigate this type of chosen location attack by having the nodes in the peer-to-peer overlay network change node identifiers periodically, or at the occurrence of selected times/events. The change in node identifiers frustrates the attacker from securing a known location on the peer-to-peer overlay network. For example, because the chosen node location lasts at most one time interval between updates, the impact of an attack is greatly reduced. It is further reduced by limiting the actions of a new node joining the peer-to-peer overlay network until it has experienced at least one node identifier update. Since routing peers can confirm that a node has correctly updated its identifier, the system provides a very simple, quantifiable form of reputation.

Figure 1:
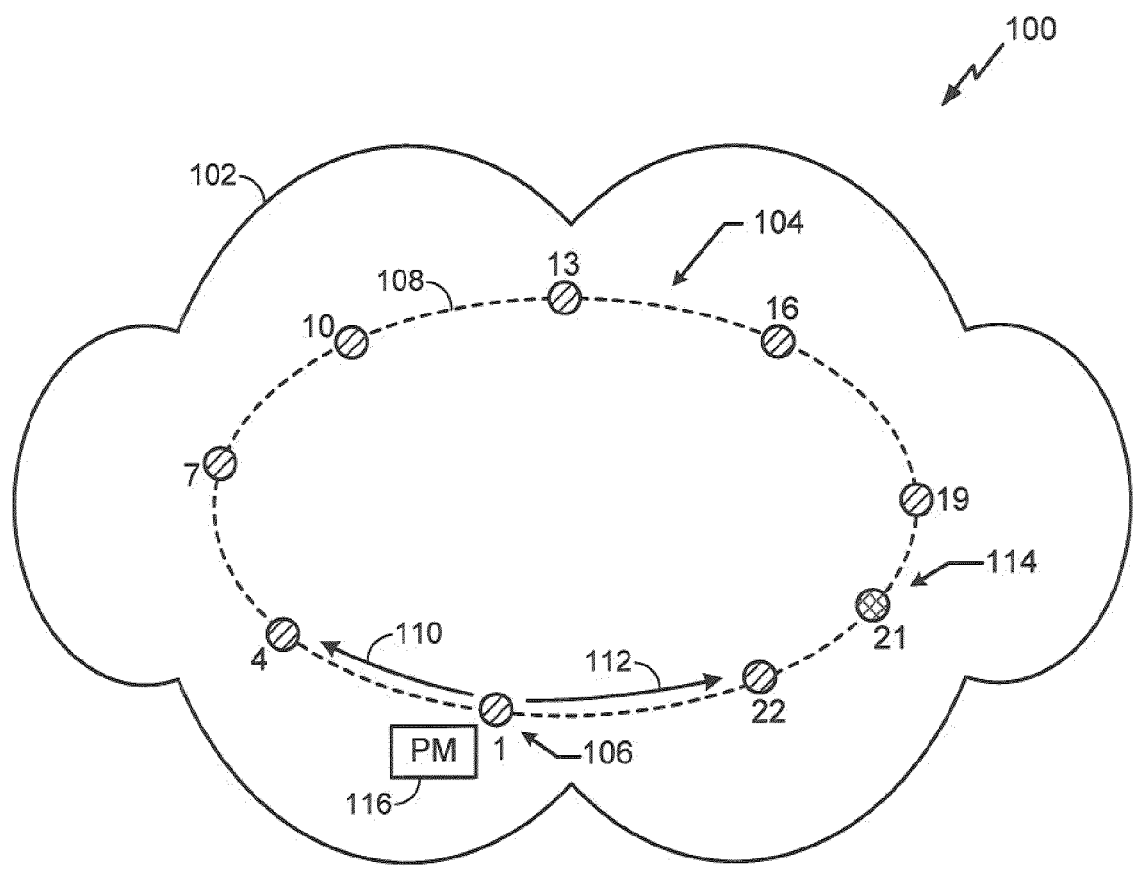
FIG. 1 shows a network that illustrates aspects of a peer-to-peer overlay protection system.

FIG. 1 shows a network 100 that illustrates aspects of a peer-to-peer overlay network protection system. The network 100 comprises an underlying network 102 which comprises any type of network, such as an Internet Protocol network. Although the underlying network 102 is shown as a single entity, the underlying network may comprise any number or types of networks such as WANs, LANs, wireless networks or any other type of network.

A peer-to-peer overlay network 104 comprises a subset of the nodes of the underlying network 102 and operates utilizing the services of the underlying network 102 to allow those nodes to communicate. For example, node 1, (as shown at 106) represents a node that is part of the peer-to-peer overlay network 104. In the peer-to-peer overlay network 104, the nodes are connected by communication links 108 to form a circular routing path. The communication links 108 may be secure tunnels provided by the underlying network 102. The peer-to-peer overlay network 104 operates with a set of permissions and interactions that are distinct from underlying network 102. It should also be noted that the peer-to-peer overlay network 104 may have any topology or architecture to enable any routing pattern and it is not limited to the routing shown in FIG. 1.

Each of the nodes in the peer-to-peer overlay network 104 establishes a node identifier. For simplicity and ease of description, the node identifiers for the eight nodes of the peer-to-peer overlay network 104 are (1, 4, 7, 10, 13, 16, 19, and 22). It should be noted that in practice, the overlay network may comprise a very large number of nodes and utilize larger node identifiers. During operation, traffic flows around the peer-to-peer overlay network 104 in either direction. Thus, node 1 may communicate with node 10 by transmitting traffic along path 110. Similarly, node 1 may communicate with node 19 by transmitting traffic along path 112.

In the event of a chosen location attack, an unauthorized entity may attempt to assert itself at a particular location on the peer-to-peer overlay network 104. For example, it will be assumed that an unauthorized entity 114 asserts itself as node 21 on the peer-to-peer overlay network. In doing so, the node 21 can monitor, disrupt, or otherwise comprise traffic between nodes 19 and 22.

To protect against the chosen location attack presented by node 21, each of the nodes of the peer-to-peer overlay network 104 comprise a protection module (PM) 116 that operates as part of the protection system to perform node identifier updates and verifications at periodic intervals or at selected points in time. By updating the node identifiers, the effectiveness of chosen location attacks as illustrated by node 21 can be reduced. A more detailed description of the PMs 116 including how they operate to protect the peer-to-peer overlay network 104 against chosen location attacks is provided below.

Joining the Overlay Network

Referring again to FIG. 1, the entity 114 joins the peer-to-peer overlay network 104 by asserting node identifier 21 and thereby determines its location on the overlay network. Because the protection system does not use a centralized enrollment server, the entity 114 is not challenged and is allowed to join the overlay using the node identifier 21. However, because node 21 is new to the peer-to-peer overlay network 104, the protection system operates to restrict the operation of node 21 on the overlay network. For example, in an aspect, node 21 is restricted to operate as a routing node to allow traffic to be routed between nodes on the peer-to-peer overlay network 104. However, the restrictions prevent node 21 from accessing or offering services, or taking responsibility for resources or other network functions until after at least one update of the node identifiers as described below.

Node Identifier Update

Figure 2:
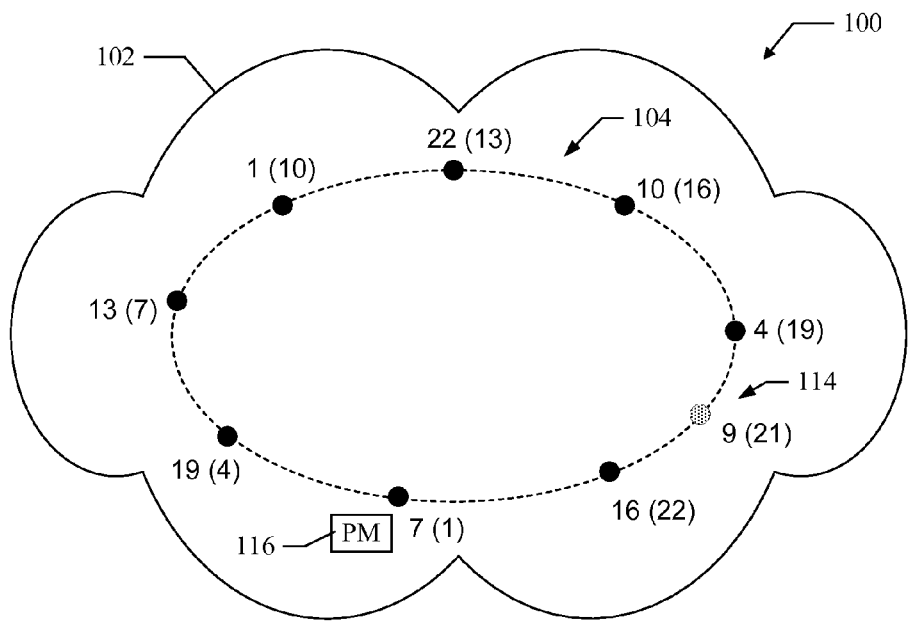
FIG. 2 shows the network of FIG. 1 after a node identifier update has occurred in accordance with aspects of a peer-to-peer overlay protection system.

FIG. 2 shows the network 100 after a node identifier update has occurred in accordance with aspects of a peer-to-peer overlay protection system. In an aspect, a PM 116 at each node operates to perform a node identifier update at selected times or at selected time intervals. To facilitate node identifier updates, the PMs 116 at each node maintain synchronized timing. During a node identifier update, the PMs 116 utilize various types of information they maintain as inputs to a hash function to determine the updated node identifiers. The following is an exemplary list of information maintained by each PM 116 that may be selectably input to the hash function.
1. Current time
2. Node email address
3. Node IP address
4. Salt value
5. Current node identifier As illustrated in FIG. 2, new node identifiers are shown for each node of the overlay network 104 along with the old node identifier shown in parenthesis. For the purpose of this description, the new node identifiers shown in FIG. 2 are exemplary and it is possible that other node identifiers may be generated. For example, the node previously having node identifier 1 now has a new node identifier 7. Other nodes in the peer-to-peer overlay network 104 also have new node identifiers as illustrated in FIG. 2.

With regards to the entity 114 that previously asserted node identifier 21, this entity now asserts node identifier 9.

Confirming Updated Node Identifiers

Once new node identifiers are determined, each PM at each node transmits its new identifier to its adjacent nodes. For example, each node maintains communication links to its adjacent nodes just prior to the node identifier update. After the update, the PMs transmit the new node identifiers over the existing communication links to the adjacent nodes for distribution over the peer-to-peer overlay network 104.

In an aspect of the protection system, a node's new identifier can be verified by other nodes in the peer-to-peer overlay network 104. For example, the information that the PM at a particular node uses as inputs to the hash function is known to other nodes in the peer-to-peer overlay network 104. For example, the information shown above that is maintained at each node is available to all nodes on the peer-to-peer overlay network 104. Thus, other nodes on the peer-to-peer overlay network 104 can verify an updated node identifier asserted by a particular node by performing the hash function using the information associated with that particular node. If a node's identifier cannot be verified, the node may be excluded from the peer-to-peer overlay network or some other action may be taken.

Referring again to FIG. 2, the entity 114 may assert its new node identifier 9 to its previously adjacent nodes (i.e., new node identifiers 16 and 4). The PMs at nodes 16 and 4 operate to verify that node identifier 9 is correct by re-hashing the inputs that were used by entity 114 in an attempt to re-generate node identifier 9. If the new node identifier 9 cannot be verified by any of the adjacent nodes, the entity 114 may be excluded from the peer-to-peer overlay network or some other action may be taken.

Figure 3:
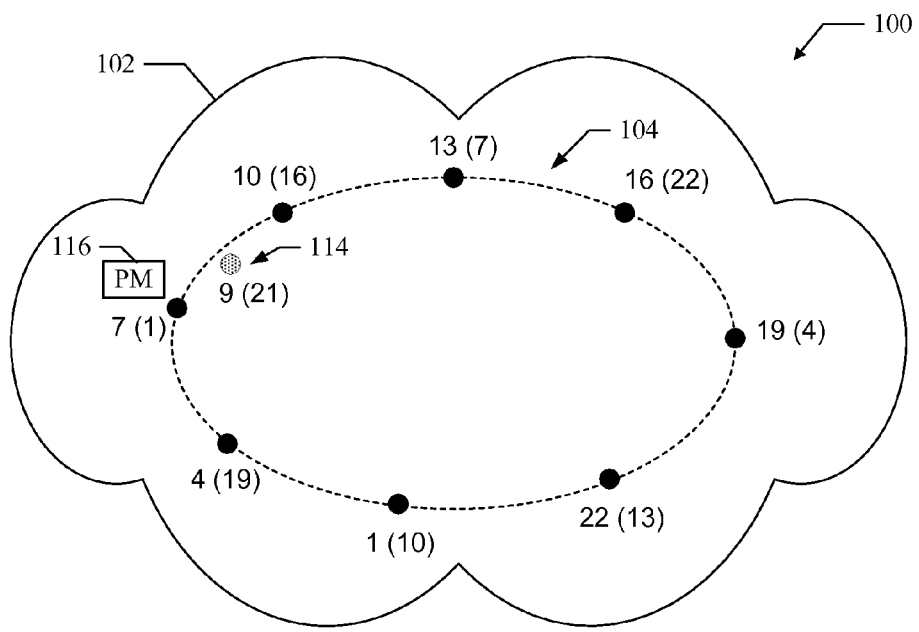
FIG. 3 shows the network of FIG. 2 after a node identifier update has occurred and wherein the nodes have established communications with each other in accordance with aspects of a peer-to-peer overlay protection system.

FIG. 3 shows the network 100 after a node identifier update has occurred and wherein the nodes have established communications with each other to obtain a desired routing pattern in accordance with aspects of a peer-to-peer overlay protection system. For example, after a node identifier update occurs, each node determines who its new neighbors are so that new communication links to the new neighbors can be established and thereby allow a particular routing path around the overlay network to be re-established.

Assuming that the node identifier 9 associated with the entity 114 cannot be verified by other nodes in the overlay network, the entity 114 is excluded from the overlay. For example, the entity 114 is shown at location where a node with node identifier 9 would be located; however, the entity 114 is shown as excluded from the overlay so that it has no communication links to other nodes in the peer-to-peer overlay network.

Updating Fingers of the Overlay Network

Figure 4:
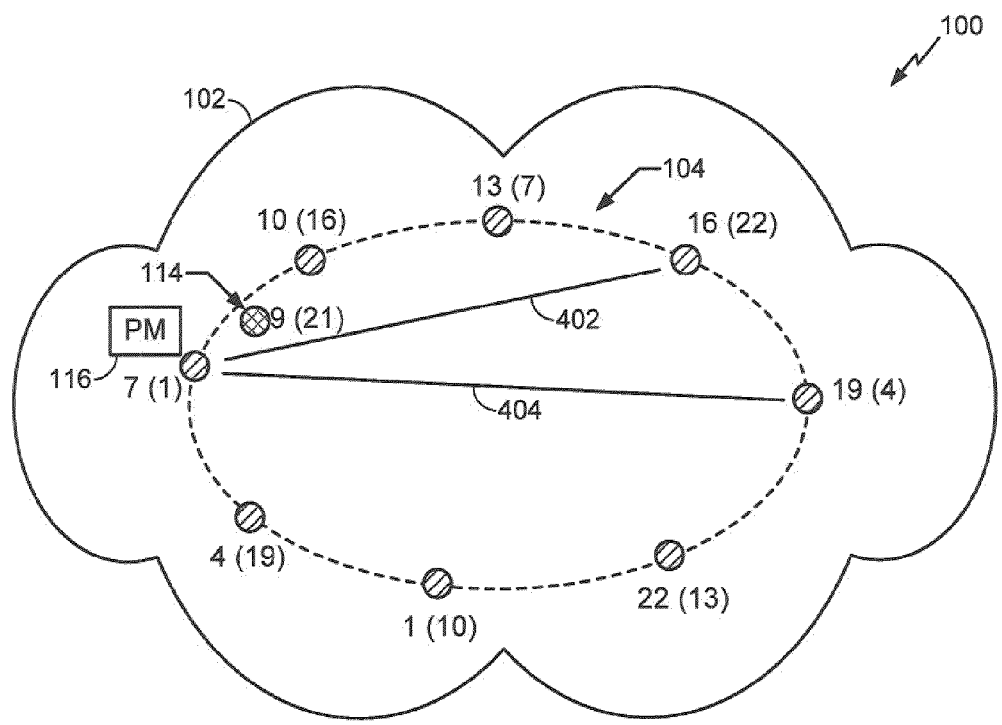
FIG. 4 shows the network of FIG. 3 after a node identifier update has occurred and wherein the nodes maintain selected fingers in accordance with aspects of a peer-to-peer overlay protection system.

FIG. 4 shows the network 100 after a node identifier update has occurred wherein and the nodes have established communications with each other to obtain the desired routing pattern in accordance with aspects of a peer-to-peer overlay protection system. Once the new communication links are established, a node may still have its original communication links which form chords (or fingers) that form direct paths across the peer-to-peer overlay network. For example, the node 7 maintains its communication link with node 16 as shown at 302 and with node 19 as shown at 304.

In an aspect, maintaining "old" fingers is a mechanism for providing a random and denser interconnection set between the nodes than would be present using only adjacencies determined from the new node identifiers. As such, the system provides secondary protection against a chosen location attack's ability to successfully hinder access to a particular node. For example, a successful attack would have to simultaneously attack a node's current and former node identifier locations, which implies knowledge of the current node identifiers of the node's previously adjacent nodes. Therefore, in an aspect, a dense interconnection set is useful in and of itself, and the system is operable to adjust the number of previous adjacencies to maintain to meet an overall connectivity goal.

In an aspect, the communication fingers may be maintained or removed after the new communication links are established. For example, in an aspect, the fingers are dropped over time, for instance, after the next node identifier update is performed.

Therefore, the peer-to-peer overlay network protection system comprises protection modules that operate to allow new node identifiers to be generated thereby minimizing the effectiveness of a chosen location attack. Furthermore, any new identifier associated with a particular node may be verified by other nodes on the peer-to-peer overlay network. This reduces further the effectiveness of any entity attempting a chosen location attack since this entity's operation will be limited to the time interval between node identifier updates. In addition, the operation of new nodes joining the overlay is restricted further mitigating the impact of any attacker.

Figure 5:
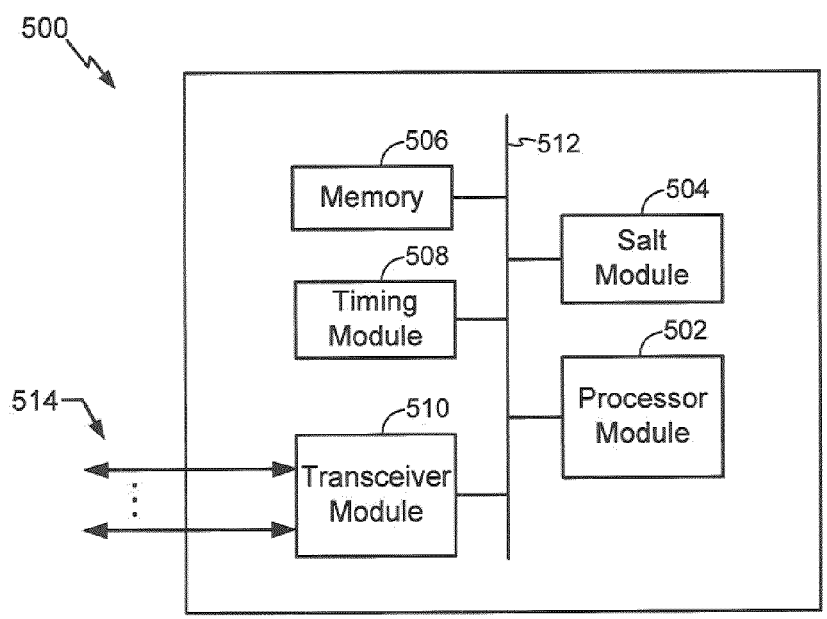
FIG. 5 shows a protection module for use in aspects of a peer-to-peer overlay protection system.

FIG. 5 shows a protection module 500 for use in aspects of a peer-to-peer overlay protection system. For example, the protection module 500 is suitable for use as the protection module 116 shown in FIG. 1. The protection module 500 comprises processor module 502, salt module 504, memory 506, timing module 508, and transceiver module 510 all coupled to a data bus 512. It should be noted that the protection module 500 is just one implementation and that other implementations are possible within the scope of the aspects.

The transceiver module 510 comprises hardware and/or hardware executing software that operates to allow the protection module 500 to communicate data or other information with a plurality of nodes on a peer-to-peer overlay network. In an aspect, the transceiver module 510 is operable to establish one or more communication links 514 with nodes of the peer-to-peer overlay network. For example, the communication links 514 may be secure tunnels that are formed utilizing the services of an underlying IP network.

The memory module 506 comprises any suitable storage device operable to store a database comprising information associated with one or more nodes of a peer-to-peer overlay network. For example, the information comprises, but is not limited to, email addresses, IP addresses, node identifiers, salt values or any other type of information. For example, the database may also contain a time value indicating when a new node identifier is to be generated.

The timing module 508 comprises hardware and/or hardware executing software that operates to provide synchronized timing for the protection module 500. In an aspect, the timing module 508 is synchronized with other nodes of the peer-to-peer overlay network. Thus, the timing module makes it possible for the protection module 500 to perform functions that are synchronized with other nodes on the peer-to-peer overlay network. Such functions include the generation of new node identifiers.

The salt module 504 comprises hardware and/or hardware executing software that operates to generate salt values that may be utilized to generate new node identifiers. In an aspect, a salt value generated by the salt module 504 is transmitted to other nodes on the peer-to-peer overlay network. The salt value is used as an input to a hash function to generate a new node identifier. In an aspect, the salt module 504 utilizes any suitable function or algorithm to generate salt values.

In one or more aspects, the processor module 502 comprises at least one of a CPU, processor, gate array, hardware logic, memory elements, and/or hardware executing software. In an aspect, the processor module 502 operates to control the protection module to perform the following functions.

Generation of Node Identifiers

In an aspect, the processor module 502 performs a hash function to generate new node identifiers. For example, the processor module 502 maintains information in a database stored in the memory 506 that can be selectably input to a hash function. The information stored in the database also identifies a time when a new node identifier is to be generated. The processor module uses the timing module 508 to detect when time for generating the new node identifier has occurred, and in response, uses selected information from the database as inputs to the hash function to generate a new node identifier. The processor module 502 operates to transmit the new node identifier to other nodes on a peer-to-peer overlay network by controlling the transceiver module 510 to transmit the information on the communication links 514.

Verify Node Identifiers

In another aspect, the processor module 502 is configured to verify node identifiers associated with one or more nodes. After a node identifier update occurs, nodes of the peer-to-peer overlay network transmit their new node identifiers on the peer-to-peer overlay network. The processor module 502 operates to verify whether a new node identifier associated with a particular node is correct. For example, the processor module 502 obtains information associated with the particular node from the database stored in the memory 506. In an aspect, the information that nodes use to generate new node identifiers is known to all nodes on the peer-to-peer overlay network. After obtaining the selected information, the processor module 502 performs a hash function using the appropriate information as inputs to generate a node identifier for a particular node. This generated node identifier should match the new node identifier received from that particular node. If the generated node identifier does not match the received identifier, then it is assumed that the node is a possible attacker and may be further restricted from the peer-to-peer overlay network.

Initiate the Generation of Node Identifiers

In another aspect, the processor module 502 is configured to initiate the generation of new node identifiers for all nodes on the peer-to-peer overlay network. In an aspect, the processor module 502 determines if the current node identifier is equal to a pre-selected value or if the current node identifier is closer to the selected value than are other nodes on the peer-to-peer overlay network. If the current value is closest, then the processor module 502 determines that it is responsible for initiating the next node identifier update.

To initiate the next node identifier update, the processor module 502 determines a time for the update and a salt value. The salt value is obtained from the salt module 505. The time for the update and the salt value are transmitted to other nodes on the peer-to-peer overlay network. At the determined time, all nodes on the peer-to-peer overlay network compute a new node identifier by inputting the salt value, and possibly other information, into a hash function. Once the new node identifiers are generated, the nodes transmit these identifiers to other nodes on the peer-to-peer overlay network.

In another aspect, it is assumed that the time for generating new node identifiers is known to all nodes on the peer-to-peer overlay network. In this case, the processor module 502 obtains a salt value from the salt module 505 and transmits this salt value to the other nodes on the peer-to-peer overlay network. Thus, the amount of information to be distributed to the other nodes is reduced.

In an aspect, the peer-to-peer overlay network protection system comprises a computer program product having one or more program instructions ("instructions") or sets of "codes" stored or embodied on a machine-readable medium. When the codes are executed by at least one processor, for instance, a processor at the processor module 502, their execution causes the protection module 500 to provide the functions of the peer-to-peer overlay network protection system described herein. For example, the machine-readable medium comprises a floppy disk, CDROM, memory card, FLASH memory device, RAM, ROM, or any other type of memory device or machine-readable medium that interfaces to the protection module 500. In another aspect, the sets of codes may be downloaded into the protection module 500 from an external device or communication network resource. The sets of codes, when executed, operate to provide aspects of a peer-to-peer overlay network protection system as described herein.

Figure 6:
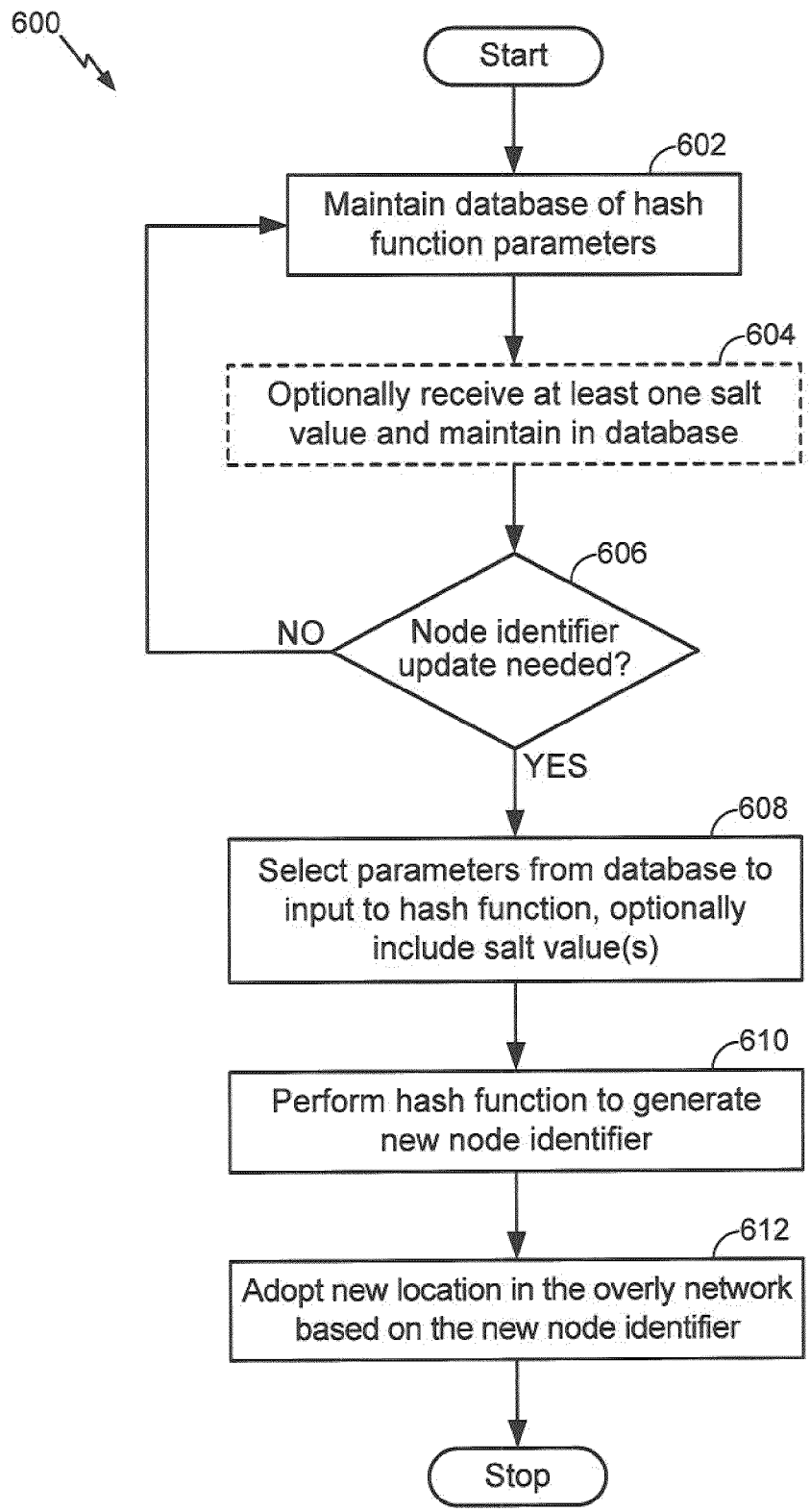
FIG. 6 shows an exemplary method for operating a node to provide aspects of a peer-to-peer overlay network protection system.

FIG. 6 shows an exemplary method 600 for operating a node to provide aspects of a peer-to-peer overlay network protection system. For clarity, the method 600 is described below with reference to the protection module 500 shown in FIG. 5. In an aspect, the processor module 502 executes one or more sets of codes to control the protection module 500 to perform the functions described below.

At block 602, a database of parameters that can be input to a hash function is maintained. In an aspect, the processor module 502 maintains the database in the memory 506. For example, the database comprises, but is not limited to, current time, email addresses, IP addresses, current node identifiers, salt values or any other parameters related to one or more nodes operating on a peer-to-peer overlay network.

At block 604, in an optional step, at least one salt value is received from a peer-to-peer overlay network. In an aspect, the transceiver module 510 receives the at least one salt value from one or more other nodes in the overlay network and stores the at least one salt value in the database of parameters located in the memory 506. For example, the salt value(s) may be received from a particular node or multiple nodes in the peer-to-peer overlay network that has been designated to generate and distribute the salt value(s) to other nodes on the overlay network.

At block 606, a determination is made as to whether a node identifier update is needed. In an aspect, a node identifier update is determined based on the current time and/or selected event. For example, the processor module 502 determines, based on the current time and/or event, whether or not a node identifier updated is needed. If a new node identifier is needed, the method proceeds to block 608. If a new node identifier update is not needed, the method proceeds to block 602.

At block 608, parameters are selected to be input to a hash function. In an aspect, the processor module 502 determines the parameters from the database stored in the memory 506. For example, the parameters to be input to the hash function comprises, but are not limited to, current time, email addresses, IP addresses, current node identifiers, salt values or any other parameters stored in the database. It should be noted that the parameters at any node are known by all nodes on the peer-to-peer overlay network. Thus, the parameters associated with any particular node can be used to verify that node's node identifier.

At block 610, a hash function is performed to generate a new node identifier. In an aspect, the processor module 502 operates to perform the hash function by retrieving the appropriate parameters from the memory 506 and inputting the parameters into a pre-determined hash function to generate the new node identifier.

At block 612, a new location on the peer-to-peer overlay network is adopted based on the new node identifier. In an aspect, the transceiver module 510 operates to establish links with nodes that are now adjacent to the current node based on the new node identifier.

Therefore, the method 600 is operable at a node to provide aspects of a peer-to-peer overlay network protection system. It should be noted that the method 600 is just one implementation and that the operations of the method 600 may be rearranged or otherwise modified within the scope of the various aspects. Thus, other implementations are possible with the scope of the various aspects described herein.

Figure 7:
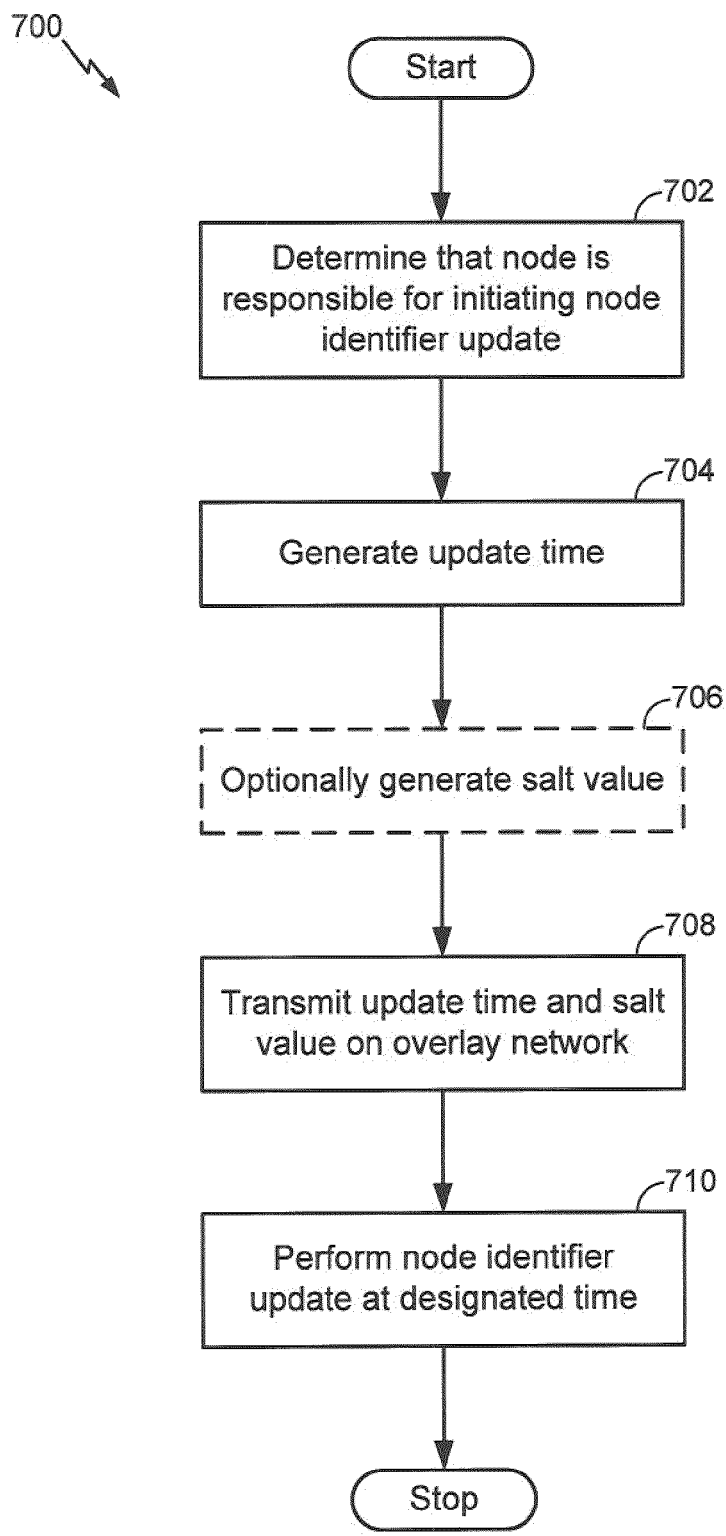
FIG. 7 shows an exemplary method for operating a node to initiate a node identifier update for use in aspects of a peer-to-peer overlay network protection system.

FIG. 7 shows an exemplary method 700 for operating a node to initiate a node identifier update for use in aspects of a peer-to-peer overlay protection system. For example, the method 700 is suitable for by a protection module operating at a node in a peer-to-peer overlay network that has been designated to initiate a node identifier update for all nodes in the peer-to-peer overlay network. For clarity, the method 700 is described below with reference to the protection module 500 shown in FIG. 5. In an aspect, the processor module 502 executes one or more sets of codes to control the protection module 500 to perform the functions described below.

At block 702, a determination is made that a node is responsible for initiating a node identifier update in a peer-to-peer overlay network. In an aspect, the processor module 502 determines that the current node identifier is closest to a pre-selected value. For example, the node having a node identifier closest to the pre-selected value is the node responsible for initiating the next node identifier update. It will be assumed that the protection module 500 is included in a node having a node identifier that is closest to the pre-selected value.

At block 704, an update time is generated which indicates when the node identifier update is to occur. In an aspect, the processor module 502 generates the update time.

At block 706, in an optional operation, a salt value is generated. In an aspect, the salt module 504 generates the salt value. In an aspect, the salt value is a parameter that is used as an input to a hash function.

At block 708, the update time and optional salt value are transmitted to nodes on the peer-to-peer overlay network. For example, the transceiver module 510 operates to transmit the update time and salt value as necessary.

At block 710, a node identifier update is performed at the designated update time. In an aspect, the nodes in the peer-to-peer overlay network perform a node identifier update in accordance with the method 600 shown in FIG. 6.

Therefore, the method 700 is operable at a node to initiate a node identifier update for use in aspects of a peer-to-peer overlay protection system. It should be noted that the method 700 is just one implementation and that the operations of the method 700 may be rearranged or otherwise modified within the scope of the various aspects.

Figure 8:
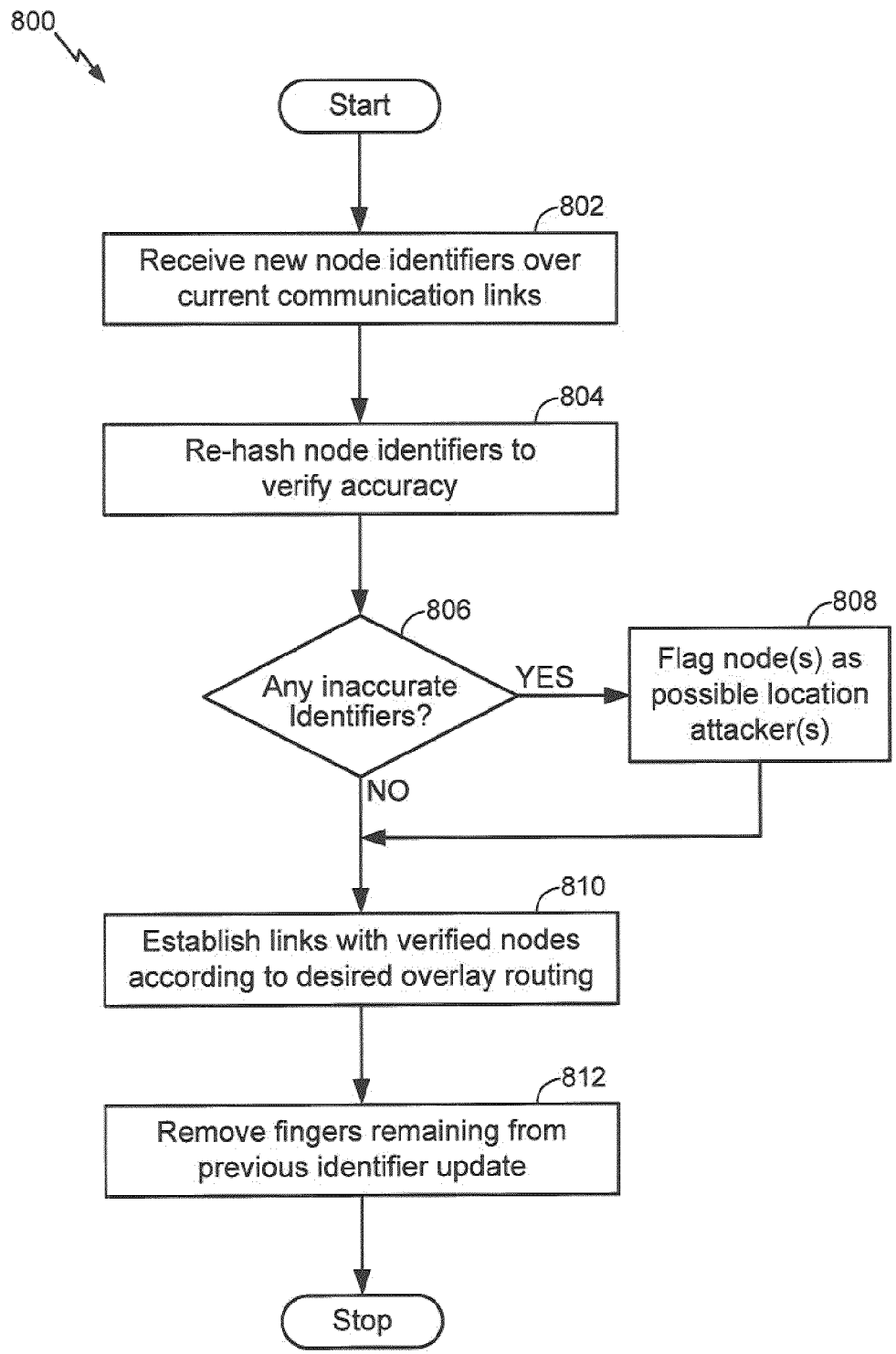
FIG. 8 shows an exemplary method for operating a node to verify node identifiers for use in aspects of a peer-to-peer overlay network protection system.

FIG. 8 shows an exemplary method 800 for operating a node to verify node identifiers for use in aspects of a peer-to-peer overlay network protection system. For clarity, the method 800 is described below with reference to the protection module 500 shown in FIG. 5. In an aspect, the processor module 502 executes one or more sets of codes to control the protection module 500 to perform the functions described below.

At block 802, one or more new node identifiers are received from one or more nodes on a peer-to-peer overlay network. In an aspect, the transceiver module 510 operates to receive the new node identifiers using the communication links 514.

At block 804, a hashing function is performed to generate node identifiers for the nodes that have provided the new node identifiers at block 802. In an aspect, the processor module 402 operates obtain parameter sets associated with each of the one or more nodes from the database in the memory 506. Each parameter sets is input to a hash function performed by the processor module 502 to generate a corresponding node identifier.

At block 806, a determination is made as to whether any of the new node identifiers received at block 802 fail to match their corresponding identifier generated at block 804. In an aspect, the processor module 502 operates to compare the new node identifiers with the corresponding node identifiers. If any of the node identifiers fail to match, the method proceeds to block 808. If all the node identifiers match, the method proceeds to block 810.

At block 808, the nodes associated with failed node identifiers are flagged as being possible location attackers. In an aspect, the processor module 502 performs this function. For example, the processor module 502 may communicate with other nodes in the overlay network to signal the verification failure of a particular node identifier.

At block 810, communication links are established with nodes having verified node identifiers. In an aspect, the processor module 502 operates to control the transceiver module 510 to establish communication links with nodes having verified node identifiers so that a desired peer-to-peer overlay network routing pattern can be established.

At block 812, communication fingers which may exist from previous node identifier configurations may be removed. In an aspect, each node maintains an interconnection set to meet an overall connectivity goal. Thus, the processor module 502 operates to determine how many and which communication fingers are to be maintained to meet the overall connectivity goal. In an aspect, the transceiver module 510 operates to terminate any communication fingers that have been identified for termination by the processor module 502 so that an overall connectivity goal can be achieved.

Therefore, the method 800 operates at a node to verify node identifiers for use in aspects of a peer-to-peer overlay network protection system. It should be noted that the method 800 is just one implementation and that the operations of the method 800 may be rearranged or otherwise modified within the scope of the various aspects.

Figure 9:
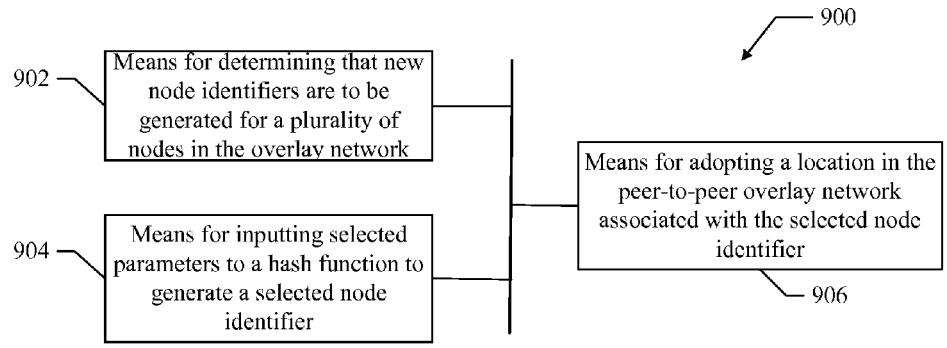
FIG. 9 shows an exemplary protection module for use in aspects of a peer-to-peer overlay network protection system.

FIG. 9 shows an exemplary protection module 900 for use in aspects of an overlay network protection system. For example, the protection module 900 is suitable for use as the protection module 500 shown in FIG. 5. In an aspect, the protection module 900 is implemented by at least one integrated circuit comprising one or more modules configured to provide aspects of an overlay network protection system as described herein. For example, in an aspect, each module comprises hardware and/or hardware executing software.

The protection module 900 comprises a first module comprising means (902) for determining that new node identifiers are to be generated for a plurality of nodes in the overlay network, which in an aspect comprises the timing module 508. The protection module 900 also comprises a second module comprising means (904) for inputting selected parameters to a hash function to generate a selected node identifier, which in an aspect comprises the processor module 502. The protection module 900 also comprises a third module comprising means (906) for adopting a location in the peer-to-peer overlay network associated with the selected node identifier, which in an aspect comprises the processor module 502.

Figure 10:
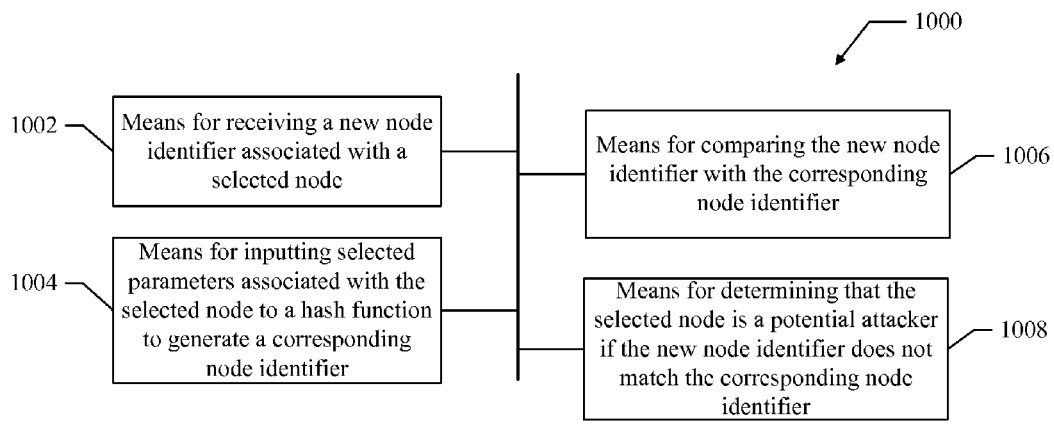
FIG. 10 shows an exemplary protection module for use in aspects of a peer-to-peer overlay network protection system.

FIG. 10 shows an exemplary protection module 1000 for use in aspects of an overlay network protection system. For example, the protection module 1000 is suitable for use as the protection module 500 shown in FIG. 5. In an aspect, the protection module 1000 is implemented by at least one integrated circuit comprising one or more modules configured to provide aspects of an overlay network protection system as described herein. For example, in an aspect, each module comprises hardware and/or hardware executing software.

The protection module 1000 comprises a first module comprising means (1002) for receiving a new node identifier associated with a selected node, which in an aspect comprises the transceiver module 510. The protection module 1000 also comprises a second module comprising means (1004) for inputting selected parameters associated with the selected node to a hash function to generate a corresponding node identifier, which in an aspect comprises the processor module 502. The protection module 1000 also comprises a third module comprising means (1006) for comparing the new node identifier with the corresponding node identifier, which in an aspect comprises the processor module 502. The protection module 1000 also comprises a fourth module comprising means (1008) for determining that the selected node is a potential attacker if the new node identifier does not match the corresponding node identifier, which in an aspect comprises the processor module 502.

Figure 11:
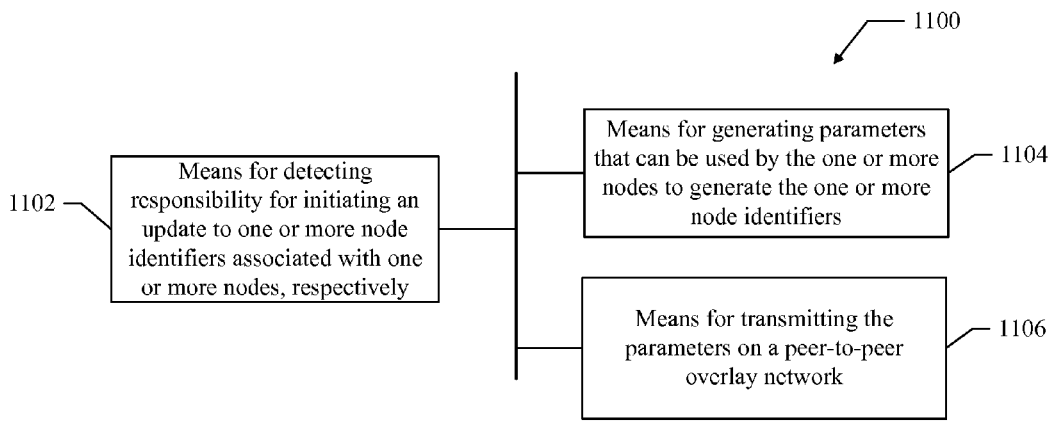
FIG. 11 shows an exemplary protection module for use in aspects of a peer-to-peer overlay network protection system.

FIG. 11 shows an exemplary protection module 1100 for use in aspects of an overlay network protection system. For example, the protection module 1100 is suitable for use as the protection module 500 shown in FIG. 5. In an aspect, the protection module 1100 is implemented by at least one integrated circuit comprising one or more modules configured to provide aspects of an overlay network protection system as described herein. For example, in an aspect, each module comprises hardware and/or hardware executing software.

The protection module 1100 comprises a first module comprising means (1102) for detecting responsibility for initiating an update to one or more node identifiers associated with one or more nodes, respectively, which in an aspect comprises the processor module 502. The protection module 1100 also comprises a second module comprising means (1104) for generating parameters that can be used by the one or more nodes to generate the one or more node identifiers, which in an aspect comprises the processor module 502. The protection module 1100 also comprises a third module comprising means (1106) for transmitting the parameters on the peer-to-peer overlay network, which in an aspect comprises the transceiver module 510.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can reAD information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a peer-to-peer overlay network protection system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for operating a node to protect against chosen location attacks in a peer-to-peer overlay network, the method comprising:
   determining, by a timing module at the node, that new node identifiers are to be generated for a plurality of nodes in the overlay network;
   inputting, by a processor at the node, selected parameters to a hash function to generate a selected node identifier, wherein the selected node identifier is verified by a first set of nodes that are adjacent to the node before generation of the selected node identifier; and
   adopting, by the processor at the node, a location in the peer-to-peer overlay network associated with the selected node identifier by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

2. The method of claim 1, further comprising maintaining a database comprising the selected parameters.

3. The method of claim 1, further comprising:
   receiving at least one salt value; and
   inputting to the hash function the at least one salt value as part of the selected parameters to generate the selected node identifier.

4. The method of claim 1, wherein said determining comprises determining that the new node identifiers are to be generated based on a time indicator.

5. The method of claim 1, wherein the selected parameters comprises at least one of a time indicator, an email address, an IP address, a current node identifier, and a salt value.

6. The method of claim 1, wherein the first set of nodes verify the selected node identifier of the node by re-hashing the parameters to attempt to re-generate the selected node identifier.

7. The method of claim 6, wherein the first set of nodes verify the selected node identifier prior to the node adopting the location in the peer-to-peer overlay network associated with the selected node identifier.

8. A node operable to protect against chosen location attacks in a peer-to-peer overlay network, the node comprising:
   means for determining that new node identifiers are to be generated for a plurality of nodes in the overlay network;
   means for inputting selected parameters to a hash function to generate a selected node identifier, wherein the selected node identifier is verified by a first set of nodes that are adjacent to the node before generation of the selected node identifier; and
   means for adopting a location in the peer-to-peer overlay network associated with the selected node identifier by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

9. The node of claim 8, further comprising means for maintaining a database comprising the selected parameters.

10. The node of claim 8, further comprising:
    means for receiving at least one salt value; and
    means for inputting to the hash function the at least one salt value as part of the selected parameters to generate the selected node identifier.

11. The node of claim 8, wherein said means for determining comprises means for determining that the new node identifiers are to be generated based on a time indicator.

12. The node of claim 8, wherein the selected parameters comprises at least one of a time indicator, an email address, an IP address, a current node identifier, and a salt value.

13. A node operable to protect against chosen location attacks in a peer-to-peer overlay network, the node comprising:
    a timing module, comprising hardware, configured to determine that new node identifiers are to be generated for a plurality of nodes in the overlay network; and
    a processor configured to:
      input selected parameters to a hash function to generate a selected node identifier, wherein the selected node identifier is verified by a first set of nodes that are adjacent to the node before generation of the selected node identifier; and
      adopt a location in the peer-to-peer overlay network associated with the selected node identifier by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

14. The node of claim 13, further comprising a memory configured to maintain a database comprising the selected parameters.

15. The node of claim 13, wherein said processor is further configured to:
    receive at least one salt value; and
    input to the hash function the at least one salt value as part of the selected parameters to generate the selected node identifier.

16. The node of claim 13, wherein said timing module is configured to determine that the new node identifiers are to be generated based on a time indicator.

17. The node of claim 13, wherein the selected parameters comprises at least one of a time indicator, an email address, an IP address, a current node identifier, and a salt value.

18. A non-transitory computer-readable medium to protect against chosen location attacks in a peer-to-peer overlay network embodying codes executable to:
    determine that new node identifiers are to be generated for a plurality of nodes in the overlay network;
    input selected parameters to a hash function to generate a selected node identifier, wherein the selected node identifier is verified by a first set of nodes that are adjacent to the node before generation of the selected node identifier; and
    adopt a location in the peer-to-peer overlay network associated with the selected node identifier by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

19. The computer-readable medium of claim 18, wherein said codes are further configured to maintain a database comprising the selected parameters.

20. The computer-readable medium of claim 18, wherein said codes are further configured to:
    receive at least one salt value; and
    input to the hash function the at least one salt value as part of the selected parameters to generate the selected node identifier.

21. The computer-readable medium of claim 18, wherein said codes are further configured to determine that the new node identifiers are to be generated based on a time indicator.

22. The computer-readable medium of claim 18, wherein the selected parameters comprises at least one of a time indicator, an email address, an IP address, a current node identifier, and a salt value.

23. A method for operating a node to protect against chosen location attacks in a peer-to-peer overlay network, the method comprising:
    detecting, by a processor at the node, responsibility for initiating an update to one or more node identifiers associated with one or more nodes, respectively;
    generating, by the processor at the node, parameters that can be used by the one or more nodes to generate the one or more node identifiers; and
    transmitting, by a transceiver at the node, the parameters on the peer-to-peer overlay network, wherein the parameters are used to generate a selected node identifier, wherein the selected node identifier is verified by a first set of nodes that are adjacent to the node before generation of the selected node identifier, wherein the selected node identifier is used to adopt a location for the node in the peer-to-peer overlay network by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

24. The method of claim 23, wherein the parameters comprises at least one of an update time and a salt value.

25. The method of claim 24, further comprising performing a node identifier update at the update time.

26. The method of claim 23, wherein said detecting comprises detecting responsibility when a current node identifier is equal to a selected value.

27. The method of claim 23, wherein said detecting comprises detecting responsibility when a current node identifier is closer to a selected value than any other node identifier.

28. The method of claim 23, wherein the first set of nodes verify the selected node identifier of the node by re-hashing the parameters to attempt to re-generate the selected node identifier.

29. The method of claim 28, wherein the first set of nodes verify the selected node identifier prior to the node adopting the location in the peer-to-peer overlay network associated with the selected node identifier.

30. A node configured to protect against chosen location attacks in a peer-to-peer overlay network, the node comprising:
    means for detecting responsibility for initiating an update to one or more node identifiers associated with one or more nodes, respectively;
    means for generating parameters that can be used by the one or more nodes to generate the one or more node identifiers; and
    means for transmitting the parameters on the peer-to-peer overlay network, wherein the parameters are used to generate a selected node identifier, wherein the selected node identifier is verified by a first set of nodes that are adjacent to the node before generation of the selected node identifier, wherein the selected node identifier is used to adopt a location for the node in the peer-to-peer overlay network by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

31. The node of claim 30, wherein the parameters comprises at least one of an update time and a salt value.

32. The node of claim 31, further comprising means for performing a node identifier update at the update time.

33. The node of claim 30, wherein said means for detecting comprises means for detecting responsibility when a current node identifier is equal to a selected value.

34. The node of claim 30, wherein said means for detecting comprises means for detecting responsibility when a current node identifier is closer to a selected value than any other node identifier.

35. A node configured to protect against chosen location attacks in a peer-to-peer overlay network, the node comprising:
    a processor configured to:
        detect responsibility for initiating an update to one or more node identifiers associated with one or more nodes, respectively; and generate parameters that can be used by the one or more nodes to generate the one or more node identifiers; and a transceiver configured to transmit the parameters on the peer-to-peer overlay network, wherein the parameters are used to generate a selected node identifier, wherein the selected node identifier is verified by a first set of nodes that are adjacent to the node before generation of the selected node identifier, wherein the selected node identifier is used to adopt a location for the node in the peer-to-peer overlay network by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

36. The node of claim 35, wherein the parameters comprises at least one of an update time and a salt value.

37. The node of claim 36, wherein said processor is further configured to perform a node identifier update at the update time.

38. The node of claim 35, wherein said processor is further configured to detect responsibility when a current node identifier is equal to a selected value.

39. The node of claim 35, wherein said processor is further configured to detect responsibility when a current node identifier is closer to a selected value than any other node identifier.

40. A non-transitory computer-readable medium to protect against chosen location attacks in a peer-to-peer overlay network embodying codes executable to:

detect responsibility for initiating an update to one or more node identifiers associated with one or more nodes, respectively;

generate parameters that can be used by the one or more nodes to generate the one or more node identifiers; and transmit the parameters on the peer-to-peer overlay network, wherein the parameters are used to generate a selected node identifier, wherein the selected node identifier is verified by a first set of nodes that are adjacent to the node before generation of the selected node identifier, wherein the selected node identifier is used to adopt a location for the node in the peer-to-peer overlay network by establishing links based on the selected node identifier with a second set of nodes that are adjacent to the node after generation of the selected node identifier while maintaining links based on a prior node identifier with the first set of nodes that are adjacent to the node before generation of the selected node identifier, wherein the first set of nodes is different from the second set of nodes, wherein the links between the node and the first set of nodes after generation of the selected node identifier comprise chords that form direct paths across the peer-to-peer overlay network, and wherein at least one of the first set of nodes is not adjacent to the node after generation of the selected node identifier.

41. The computer-readable medium of claim 40, wherein the parameters comprises at least one of an update time and a salt value.

42. The computer-readable medium of claim 41, wherein said codes are further configured to perform a node identifier update at the update time.

43. The computer-readable medium of claim 40, wherein said codes are further configured to detect responsibility when a current node identifier is equal to a selected value.

44. The computer-readable medium of claim 40, wherein said codes are further configured to detect responsibility when a current node identifier is closer to a selected value than any other node identifier.

* * * * *